United States Patent Office

3,267,145
Patented August 16, 1966

3,267,145
PROCESS FOR PRODUCING NUCLEAR SUBSTITUTED AROMATIC AMINES
Richard B. Lund, Whippany, and John Vitrone, Parsippany, N.J., assignors to Allied Chemical Corporation, New York, N.Y., a corporation of New York
No Drawing. Filed July 25, 1963, Ser. No. 297,693
22 Claims. (Cl. 260—570)

This invention relates to a process for reacting an aralkyl alcohol with an aromatic amine and more particularly to a process for the production of aralkyl nuclear substituted aromatic amines.

Aralkyl nuclear substituted aromatic amines are known to be useful as crosslinking agents for chlorinated rubbers and epoxy resins and as intermediates in the preparation of polyamides and isocyanates. Conventional procedures for reacting aralkyl alcohols with an aromatic amine, wherein the aralkyl constituent of the aralkyl alcohol is substituted for a hydrogen atom in the nucleus of the aromatic amine, involves reaction in the presence of an acid catalyst such as sulfuric acid, and the so called Lewis acids, e.g. aluminum chloride and zinc chloride. Unfortunately, commercial production of aralkyl nuclear substituted aromatic amine compounds in an efficient and practical manner has been difficult because of the characteristics of the amino group. More specifically, these acid catalysts readily interact with the basic amine group of the aromatic compound to form a salt or similar complex which is undesirable because efficient substitution of the aralkyl constituent of the aralkyl alcohol in the nucleus of the aromatic ring depends to a large extent upon an unbound amine group, that is one which has not formed a salt or similar complex. Further, the interaction with the amine group to form a salt not only interferes with the reaction but the aralkyl substituted compound obtained is a salt and must be neutralized with a large excess of base to yield the desired amines. These neutralization procedures, however, are costly and time consuming, and the catalysts are frequently destroyed on contact with the basic reagents and water, precluding their use for future operations. Furthermore, in view of the sensitivity of said prior art catalysts, particularly the Lewis acids, to the effects of water, it is not convenient to use said catalysts in those procedures wherein an aralkyl alcohol is one of the reactants. Moreover, the employment of these prior art catalysts in the production of aralkyl nuclear substituted aromatic amines results in low yields, generally of the order of about 10–35%.

It is an object of the present invention to provide a process for the production of aralkyl nuclear substituted aromatic amines by reacting in admixture in the presence of an acid activated clay, an aromatic amine with an aralkyl alcohol which process is efficient and economical. Another object of the present invention is to obtain higher yields of aralkyl aromatic amines than has heretofore been obtained. A further object is to obtain the aralkyl nuclear substituted aromatic compound free from salt or similar complex formation. A still further object is to provide a process for the production of aralkyl nuclear substituted aromatic amines wherein the catalyst may be recovered and reused. Other objects and advantages will be apparent from the following description.

Broadly contemplated, aralkyl nuclear substituted aromatic amines may be produced in an efficient and economical manner with excellent yields by reacting in admixture in the presence of an acid activated clay, an aromatic amine having the formula:

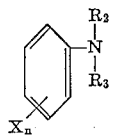

wherein $R_2$ and $R_3$ are like or unlike members selected from the group consisting of hydrogen and lower alkyl radicals containing not more than five carbon atoms; X is a halogen or lower alkyl as described above; $n$ is an integer ranging from 0 to 4 inclusive, further characterized in that less than three halogen atoms are substituted on the ring and at least one position either ortho or para to the amino group contains a substitutable hydrogen atom; and an aralkyl alcohol having the following general formula:

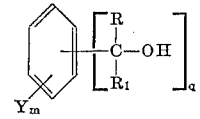

wherein R and $R_1$ are like or unlike members selected from the group consisting of hydrogen, the lower alkyl radicals, i.e. alkyl groups containing not more than 5 carbon atoms in the chain, and aralkyl, aryl, substituted aryl and cycloalkyl radicals; Y is a halogen, amino, substituted amino or lower alkyl as described herein above; $q$ is an integer ranging from 1 to 3 inclusive; $m$ is an integer ranging from 0 to 4 inclusive and is such that the sum of $m$ and $q$ does not exceed 6; and when $q$ is greater than 1 the hydroxyalkyl radicals are not positioned on adjacent carbon atoms. The reaction which takes place may be represented by the following equation:

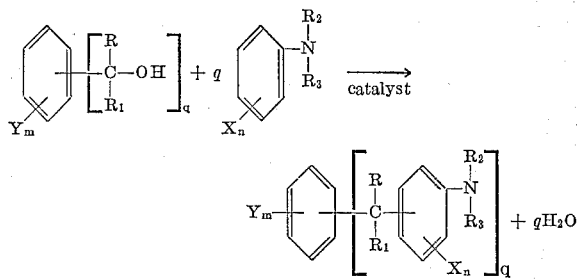

A preferred group of alcohols are cumene derivatives having the formula:

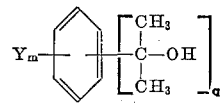

wherein Y, $m$ and $q$ have the above values.

Another preferred group of alcohols have the formula:

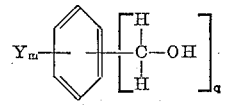

wherein Y, $m$ and $q$ have the above values.

The aralkyl nuclear substitution of the aromatic amine occurs in a position ortho or para to the amine group already present on the aromatic nucleus. In those aromatic amines which are free from both ortho and para substituents prior to the reaction, the relative ratio of ortho to para substitution is a function of the reaction time with longer periods of time being conducive to greater quantities of the para substituted derivative and smaller quantities of the ortho. Where the aromatic amines possesses two ortho substituents prior to the reaction, the aralkyl substitution takes place solely at the para position. Conversely, when the para position is blocked by a substituent, aralkyl substitution takes place at the ortho position.

Although the reaction may be carried out using stoichiometric quantities of the reactants, it has been discovered that greater efficiency and higher yields of product are obtained when about 4 to 10 mols preferably 8 to 10 mols of the aromatic amine per mol of the aralkyl alcohol are employed.

An acid-activated clay is used as catalyst in the process of this invention. Preferably the catalyst comprises an acid-activated clay of the bentonite-type. This type of clay contains about 40 to 80 percent by weight of silica and about 3 to 40 percent by weight of alumina, as well as small quantities of one or more oxides of other metals such as iron, magnesium, sodium, calcium and potassium. We do not fully understand why the acid-activated clay used in the process of the present invention functions as an acid catalyst and yet is too weak an acid to form a salt or similar complex with the amine group of the aromatic compound. Whatever the theory or phenomena involved we found that the use of the catalyst of the present invention overcame the disadvantages of the prior art, i.e. improved yields of salt free products were obtained with recovery of the catalyst for future use.

The presence of water in the acid-activated clay negatively affects its catalytic activity. Hence, the clay must be employed in substantially anhydrous form. This may be effectively accomplished by treating the clay, either before or after its addition, with a suitable low-boiling solvent, such as benzene, toluene, cyclohexane, etc., and then distilling off the water in the form of an azeotrope with the solvent. If the clay on hand is not acid-activated, it may be activated by any suitable procedure. For example, a slurry of one part by weight of clay to 10 parts by weight of 5 percent sulfuric acid solution may be boiled for a period of one hour. The excess spent acid may then be separated from the clay first by settling and decantation and then by wringing the wet clay. The "mud" thus produced may then be dried to a powder in a flash drier. Generally speaking, an amount of acid-activated clay equivalent to about 5 to 30 percent by weight of the aromatic amine reactant is employed, about 8 to 12 percent by weight being preferred.

The reaction may be conveniently carried out at temperatures in the range from about 60 to 190° C. however, particularly outstanding results are obtained if the reaction mixture is maintained within the range of about 100–140° C. Normally, the rate of reaction is a function of the particular reagents involved and may vary from as little as about 2 hours for the completion of the reaction, to as long as about 16 to 40 hours for the completion depending upon the choice of reagents employed. In those reactions wherein a preponderance of the para substituted aromatic amine is desired, the longer reaction periods, i.e. 16 to 40 hours, are usually employed.

The aralkyl aromatic amines may be recovered from the reaction mass by any convenient means. For example, the reaction mass may be filtered to remove the clay and the crude product may then be purified by means well known in the art such as by distillation, or crystalliaztion from a suitable solvent. In a preferred operation an aralkyl compound is admixed with an aromatic amine such as aniline in the presence of an acid activated clay in anhydrous form. The reaction mixture is then heated at a temperature of about 100 to 140° C. for a period of about 2 to 40 hours. The resulting reaction mass is filtered to remove the clay and thereafter the filtrate is subjected to distillation whereby the aralkyl nuclear substituted aromatic amine is obtained.

If desired, the aralkyl nuclear substituted aromatic amines produced by the process of the present invention may be converted to isocyanates by reaction with phosgene. These isocyanates may in turn be reacted with alcohols to form urethanes and polyurethanes.

The following examples are given for the purpose of illustrating the present invention but are not intended to be limiting on the scope thereof. In the examples, a Dean-Stark apparatus was used in drying the clay by azeotropic distillation in order to return the inert solvent to the reaction mixture.

Example 1

465 parts by weight of aniline were mixed in a reactor with 172 parts by weight of toluene and 100 parts by weight of acid-activated bentonite clay (containing about 64% silica, about 17% alumina and small amounts of iron, magnesium and calcium oxides). The resulting mixture was then refluxed until all water present therein had been removed by azeotropic distillation. The mixture was next heated to a temperature of 125° C. and over a period of 1 hour, 122 parts by weight of methylphenylcarbinol were added thereto in dropwise fashion. After a total elapsed period of 5 hours during which 17.8 parts by weight of water had been separated from the reaction mixture via azeotrope, the mixture was cooled to 80° C. and the catalyst was removed therefrom by vacuum filtration.

The filtrate was transferred to a distillation apparatus and the excess aniline was thereby removed at a temperature of about 185° C. The remaining viscous oil was then distilled at 145–150° C. under 2 mm. Hg pressure to produce a mixture of ortho- and para-α-methylbenzylaniline (130 parts by weight). Gas phase chromatography revealed the ratio of para to ortho isomer to be about 1:1. This corresponded to a yield of 65% of the theoretical based upon the quantity of methylphenylcarbinol employed in the process. In a similar process, continued heating of the reactants for an additional 18 hours produced a ratio of para to ortho isomer of 7:3.

Example 2

2325 parts by weight of aniline and acid-activated bentonite clay containing about 64% silica and about 17% alumina (200 parts by weight) were added to 188 parts by weight of toluene. The resulting mixture was then distilled until all the moisture therein has been removed by azeotropic distillation. The mixture was next heated to a temperature of 120° C. whereupon 341 parts by weight of α,α'-dihydroxy-1,4-diisopropylbenzene were added thereto. The resulting reaction mixture was thereupon heated under reflux for a period of 4 hours at the end of which evolution of water from the mixture had ceased. The mixture was thereupon refluxed for an additional 4 hours at the end of which it was immediately filtered to remove the catalyst therefrom. The catalyst was washed thoroughly with toluene and the collected combined filtrates were cooled to 25° C. whereupon crystals of α,α'-bis(4-aminophenyl)-p-diisopropylbenzene were obtained. The product possessed a melting point of 162–164° and was obtained in a yield of 94% of theoretical.

Example 3

A mixture of 321 grams of p-toluidine, 60 grams of acid-activated P.C. Blue clay (bentonite-type clay containing about 63% of $SiO_2$, 23% of $Al_2O_3$, 9% of $Fe_2O_3$, 3% of CaO and 2% MgO) and 200 cc. of toluene was heated at reflux until the clay was dry. The mixture was then cooled to room temperature and 38.8 grams of α,α'-dihydroxy-1,4-diisopropylbenzene were added. The reaction mixture was heated to distill off toluene until a pot temperature of 160° C. was reached. The reaction mixture was then refluxed at 160° C. for 16 hours, after which it was cooled to about 80° C. and the clay removed by filtration. The filtrate was next cooled to 10° C. to crystallize the unreacted p-toluidine which was then removed by filtration. The filtrate was mixed with an excess of 10% aqueous HCl thereby forming an insoluble hydrochloride salt which was separated by filtration. This salt was neutralized with aqueous NaOH and the neutralized product recrystallized from methanol yielding α,α'-bis(2-amino-5-methylphenyl)-p-diisopropylbenzene having an M.P. of 140–141° C.

Example 4

A mixture of 100 ml. of toluene and 100 grams of Filtrol No. 4 (acid-activated bentonite-type clay produced by the Filtrol Corporation) was refluxed to remove the water from the clay by azeotropic distillation. The mixture was then cooled to room temperature and 57 grams of α·α'-dihydroxy-p-xylene and 780 ml. of aniline were added. The reaction mixture was refluxed for 31 hours after which it was cooled to about 80° C. and the clay removed by filtration. Distillation of the filtrate to remove toluene and excess aniline gave 97% yield of an isomeric mixture of α,α'-bis(4-aminophenyl)-p-xylene and α - (4 - aminophenyl)-α'-(2 - aminophenyl)-p-xylene. The α,α'-bis(4-aminophenyl)-p-xylene was isolated as a white crystalline solid, with an M.P. of 125–126° C. by recrystallization from ethyl acetate.

Example 5

A mixture of 279 grams of aniline, 45 grams of acid-activated P.C. Blue clay and 100 cc. of toluene was heated at reflux until all of the water was removed. The mixture was then cooled to room temperature and 63 grams of α,α',α''-trihydroxy-1,3,5-triisopropylbenzene added (mol. ratio aniline to tricarbinol of 12 to 1). The reaction mixture was then refluxed for 10 hours after which it was cooled to room temperature and the clay removed by filtration. Distillation of the filtrate to remove toluene and excess aniline gave 93 grams of a residue which set up to a solid glass. This was found to be α,α',α''-tris(p-aminophenyl)-1,3,5-triisopropylbenzene by infra red and nuclear magnetic resonance studies.

Example 6

A mixture of 75 grams of acid-activated P.C. Blue clay and 100 ml. of toluene was refluxed until the clay was dried by the removal of 7.0 ml. of water from the mixture. After the clay was dry, 50 ml. of toluene were removed from the mixture by distillation. The mixture was then cooled to room temperature and 97 grams of α,α'-dihydroxy-1,3-diisopropylbenzene and 452 ml. of aniline were added thereto. The reaction mixture was refluxed for about 19 hours after which the clay was separated by filtration. The filtrate was then distilled to remove toluene and unreacted aniline leaving a viscous liquid. This viscous liquid was mixed in HCl solution thereby forming an insoluble hydrochloride salt which was separated from the liquid phase by filtration. The hydrochloride salt was neutralized with aqueous ammonia and after crystallization from isopropanol there was obtained a 56% yield of α,α'-bis(4-aminophenyl)-m-diisopropylbenzene having a melting point of 108–110° C.

Example 7

A mixture of 50 grams of Filtrol No. 4 clay catalyst and 50 ml. of toluene were refluxed to remove the water from the clay. After the clay was dry, 210 ml. of N,N-dimethylanine and 126 grams of Michler's hydrol(tetramethyl-4,4'-diaminobenzohydrol were added. The reaction mixture was then refluxed for 18 hours following which the clay was removed by filtration. After removal of toluene and unreacted N,N-dimethylaniline by distillation and recrystallization from methanol, there was obtained 68 grams of tri-p-N,N-dimethylaminophenylmethane having a melting point of 173–176° C.

Example 8

106 grams of α,α'-bis(4-aminophenyl)-p-diisopropylbenzene were suspended in toluene (2600 g., 3000 ml.) in a flask equipped with a gas inlet tube, mechanical stirrer, reflux condenser, and heating mantel. Phosgene (147 g., 1.50 moles) was then passed through this suspension maintained at 105–110° C. over a period of 2 hours with vigorous agitation. The suspended salt dissolved as the reaction proceeded leaving only a small amount (3.0 g.) which was removed by filtration. Evaporation of the filtrate gave 110.7 g. of crude product melting at 72–77° C. This was recrystallized from hexane to give a 97% yield (97.7 g.) of α,α'-bis(4-isocyanatophenyl)-p-diisopropylbenzene which melted at 79–82° C.

Example 9

Finely divided α,α'-bis(4-aminophenyl)-p-diisopropylbenzene (36.6 g., 0.106 mole) was added over a period of three minutes to a rapidly agitated solution of liquid phosgene (30 ml., 0.4 mole) in toluene (100 ml.) maintained at about −10° C. Additional phosgene was then passed into the mixture at a rate of 0.37 mole per hour over a period of 70 minutes while increasing the temperature from −10° C. to 82° C. during addition of the phosgene. The reaction mixture was then allowed to come to room temperature and after 64 hours, the clear solution was refluxed for one hour whereupon the solution changed from a purple to a brown color. It was then filtered and the filtrate evaporated to dryness under vacuum to yield 42.6 grams of crude product. This was recrystallized successively from 200 ml. of hexane and then from 500 ml. of pentane to yield 31.9 g. (75.9% of theoretical) of α,α'-bis(4-isocyanatophenyl)-p-diisopropylbenzene. Elemental analysis was in good agreement with the theoretical—

Found: 78.86% carbon, 6.22% hydrogen, 7.4% nitrogen. Theoretical: 78.75% carbon, 6.10% hydrogen, 7.07% nitrogen.

Example 10.—Dimethyl urethane derivative of α,α'-bis(4-isocyanatophenyl)-p-diisopropylbenzene A suspension of anhydrous methanol (10 ml., 0.025 mole) in dry hexane (5.0 ml. was added to a solution of α,α'-bis(4-isocyanatophenyl)-p-diisopropylbenzene (0.70 g., 0.002 mole) in dry hexane (12.0 ml.). A precipitate began to form in about 15 minutes. After allowing the reaction mixture to stand for 88 hours at room temperatures, 0.75 gram of product was removed by filtration (0.80 g. theoretical). This material was recrystallized from methanol (10 ml.) to yield 0.62 gram of product melting at 166–168° C. It was then crystallized again using toluene (25 ml.) to yield 0.40 gram of product melting at 169–170° C., a final yield of 50% of theoretical based on the diisocyanate used. Elemental analysis was in good agreement with the theoretical—

Found: 73.22% carbon, 7.08% hydrogen, 6.18% nitrogen. Calculated: 73.01% carbon, 7.00% hydrogen, 6.08% nitrogen.

The mother liquors from which the above precipitates had been removed were combined and product contained therein recovered to give an additional 0.30 gram of product which melted at 166–168° C. This gave an overall yield of 0.70 gram, 88% of theoretical.

Example 11.—Polyurethane from α,α'-bis(4-isocyanatophenyl)-p-diisopropylbenzene and 1,4-butane-diol A solution of α,α'-bis(4-isocyanatophenyl)-p-diisopropylbenzene (10.0 g., 0.0252 mole) and 1,4-butane-diol (2.04 g., 0.0225 mole) in acetone (60 ml.) was prepared and allowed to stand at room temperature for five days. Removal of volatiles under reduced pressure gave a residue of 11.6 grams of polymer having an inherent viscosity of 0.15 as measured in dimethylformamide at 25° C. (0.5 g., 100 ml.) and a softening point range of 190–198° C: with decomposition as measured in air in a glass capillary tube. Differential thermal analysis showed endotherm of 130° C. and 205° C. in nitrogen and 150° C. and 297° C. in air. Exotherm in air was 290° C. Yield of product was 96.3% of theoretical.

*Example 12.—Polyurethane from α,α′-bis(4-isocyanatophenyl)-p-diisopropylbenzene and 1,6-hexane-diol*

A solution of α,α′-bis(4-isocyanatophenyl)-p-diisopropylbenzene (15.67 g., 0.040 mole) and 1,6-hexane-diol (4.60 g., 0.039 mole) in acetone (52.3 g.) was prepared and allowed to stand for five days at room temperature. Removal of volatiles under reduced pressure gave 21.0 grams of polymer (20.3 g. of theoretical) which showed a softening point range of 143–173° C. with decomposition as measured in a glass capillary tube. Differential thermal analysis showed an endotherm in nitrogen of 330° C.; an endotherm in air of 255° C., and 330° C.; and decomposition in air at 400° C. The inherent viscosity was 0.23 as measured in dimethyl-formamide at 25° C. (0.5 g./100 ml.).

In place of the aromatic amines described in the above examples, there can be substituted other aromatic amines such as N-methylaniline; N,N-dimethylaniline; N-methyl-N-ethylaniline; 2,6-dimethylaniline; 2-methyl-6-chloro-aniline; 3-methylaniline; and 2,6-dichloroaniline.

In addition, illustrative examples of other aralkyl alcohols include

α-hydroxycumene;
3,5-dibromo-α-hydroxycumene;
4-isopropyl-α-hydroxycumene;
4-n-butyl-α-hydroxycumene;
2,3,5,6-tetramethyl-α-hydroxycumene;
methyl-2,4-dichlorophenylcarbinol;
methyl-2,3,5,6-tetramethylphenylcarbinol;
methyl-3,5-dibromophenylcarbinol;
butylphenylcarbinol;
benzyl alcohol;
2,4-dichlorobenzyl alcohol;
2,6-dimethylbenzyl alcohol;
3-bromobenzyl alcohol;
2,3,5,6-tetramethylbenzyl alcohol;
p-Isopropylbenzyl alcohol and
Benzhydrol.

This invention has a number of advantages, a primary one being that aralkyl nuclear substituted aromatic amines can be prepared in a simple and economical manner and in high yield. Further by employing the catalyst of the present invention, the formation of the salt by reaction between the aromatic amine and the acid catalyst is avoided and separation of the catalyst from the reaction mixture can be simply and easily accomplished by a simple filtration procedure. Moreover, the catalyst itself is non-corrosive to the walls of the reaction vessel thereby obviating the need for the employment of expensive reaction vessels which are specifically designed to withstand the corrosive activity of prior art acid catalysts. A still further advantage is that the catalyst is not destroyed by the reaction and may be recovered and reused.

Although certain preferred embodiments of the invention have been disclosed for the purposes of illustration, it will be evident that various changes and modifications may be made therein without departing from the scope and spirit of the invention.

We claim:
1. A process for the production of aralkyl nuclear substituted aromatic amines which comprises reacting in admixture in the presence of an acid-activated clay an aromatic amine having the formula:

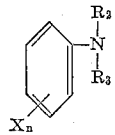

wherein $R_2$ and $R_3$ each is a member selected from the group consisting of hydrogen and alkyl radicals containing less than three carbon atoms; X is a member selected from the group consisting of chlorine and alkyl radicals containing less than six carbon atoms; $n$ is an integer ranging from 0 to 2 inclusive, hydrogen is present on at least one of the positions ortho and para to the amino substituent; and an aralkyl alcohol having the following general formula:

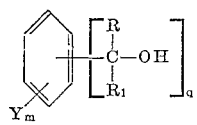

wherein R and $R_1$ are members selected from the group consisting of hydrogen, lower alkyl phenyl and amino-phenyl; Y is a member selected from the group consisting of bromine, chlorine amino, and lower alkyl; $q$ is an integer ranging from 1 to 3 inclusive; $m$ is an integer ranging from 0 to 4 inclusive and is such that the sum of $m$ and $q$ is less than seven; and when $q$ is greater than 1, the hydroxyalkyl radicals are positioned on non-adjacent atoms of the aromatic ring; said aromatic amine being employed in at least stoichiometric quantity with respect to the aralkyl alcohol.

2. The process of claim 1, wherein said clay is an anhydrous, bentonite clay containing from about 40 to 80% by weight of silica and from about 3 to 40% by weight of alumina.

3. The process of claim 1 wherein the aromatic amine is aniline.

4. The process of claim 1 wherein the aromatic amine is N-methylaniline.

5. The process of claim 1 wherein the aromatic amine is N,N-dimethylaniline.

6. The process of claim 1 wherein the aromatic amine is N-methyl-2,6-dichloroaniline.

7. The process of claim 1 wherein the aromatic amine is 2,6-dimethylaniline.

8. The process of claim 1 wherein the aromatic amine is p-toluidine.

9. The process of claim 1 wherein the aralkyl alcohol is methylphenyl carbinol.

10. The process of claim 1 wherein the aralkyl alcohol is 2,4-dichloro-α-hydroxycumene.

11. The process of claim 1 wherein the aralkyl alcohol is α,α′-dihydroxy-1,4-diisopropylbenzene.

12. The process of claim 1 wherein the aralkyl alcohol is α-hydroxycumene.

13. The process of claim 1 wherein the aralkyl alcohol is 3,5-dibromo-α-hydroxycumene.

14. The process of claim 1 wherein the aralkyl alcohol is α,α′-dihydroxy-p-xylene.

15. The process of claim 1 wherein the aralkyl alcohol is tetramethyl-4,4′-diaminobenzohydrol.

16. The process of claim 1 wherein the aralkyl alcohol is 1,3,5-triisopropylbenzene-α,α′,α″-triol.

17. The process of claim 1 wherein the aralkyl alcohol is α,α′-dihydroxy-1,3-diisopropylbenzene.

18. The process of claim 1 wherein the aromatic amine is aniline and the aralkyl alcohol is methylphenyl carbinol.

19. The process of claim 1 wherein the aromatic amine is aniline and the aralkyl alcohol is α,α'-dihydroxy-1,4-diisopropylbenzene.

20. A process according to claim 1 wherein R and R' are methyl.

21. A process according to claim 1 wherein R and R' are hydrogen.

22. A process for the production of aralkyl nuclear substituted aromatic amines which comprises reacting in admixture in the presence of an acid-activated bentonite clay containing from about 40 to 80% by weight of silica and from about 3 to 40% by weight of alumina at a temperature within the range of about 60 to 190° C. an aromatic amine having the formula:

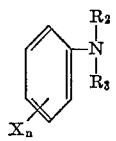

wherein $R_2$ and $R_3$ each is a member selected from the group consisting of hydrogen and alkyl radicals containing less than three carbon atoms; X is a member selected from the group consisting of chlorine and alkyl radicals containing less than six carbon atoms; $n$ is an integer ranging from 0 to 2 inclusive, and a hydrogen atom is present on at least one of the positions ortho and para to the amino substituents, and an aralkyl alcohol having the following general formula:

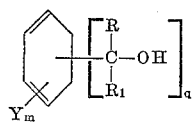

wherein R and $R_1$ are members selected from the group consisting of hydrogen, lower alkyl phenyl and aminophenyl; Y is a member selected from the group consisting of bromine, chlorine amino, and lower alkyl; $q$ is an integer ranging from 1 to 3 inclusive; $m$ is an integer ranging from 0 to 4 inclusive and is such that the sum of $m$ and $q$ is less than seven and when $q$ is greater than 1 the hydroxyalkyl radicals are positioned on non-adjacent carbon atoms of the aromatic ring; said aromatic amine being employed in at least stoichiometric quantity with respect to the arakyl alcohol.

References Cited by the Examiner

UNITED STATES PATENTS 2,683,730  7/1954  Seeger et al. _____ 260—453

FOREIGN PATENTS 614,663  3/1962  Belgium.

CHARLES B. PARKER, *Primary Examiner.*

ROBERT V. HINES, *Assistant Examiner.*